July 17, 1962  L. X. SPITZMILLER ET AL  3,044,116
TUBELESS TIRE REPAIR APPARATUS Filed July 25, 1960  2 Sheets-Sheet 1

*INVENTORS*
LEO X. SPITZMILLER
JOHN L. VOGLER
BY
*John H. Widdowson*
ATTORNEY

July 17, 1962   L. X. SPITZMILLER ET AL   3,044,116
TUBELESS TIRE REPAIR APPARATUS
Filed July 25, 1960   2 Sheets-Sheet 2

INVENTORS
Leo X. Spitzmiller
John L. Vogler
BY
John H. Widdowson
ATTORNEY

United States Patent Office 3,044,116
Patented July 17, 1962

3,044,116
TUBELESS TIRE REPAIR APPARATUS
Leo X. Spitzmiller, 409 W. 1st St., and John L. Vogler, Box 174, Rte. 2, both of Medicine Lodge, Kans.
Filed July 25, 1960, Ser. No. 45,114
3 Claims. (Cl. 18—18)

This invention relates to repair means for automobile tires and the like, and more particularly to a repair apparatus designed particularly for use with tubeless tires.

Various types of tire or tube repair means are known in the prior art. Prior to the tubeless tire in the industry, these repair devices were directed to means for retreading or repairing conventional tires. When tubeless tires were developed, it became readily apparent that conventional type repair means were unsatisfactory for these tires. More particularly, the repair devices previously known were directed primarily to means for making repairs on the exterior of the tire, while in many cases it is desirable, if not essential, that repairs on tubeless tires be made on the interior of the tire carcass. This becomes necessary due to the fact that the sealing liner which forms the air impervious portion of the tire carcass is secured to the inside of the first ply of the tire. This rubber or butyl liner is very thin and requires special handling and procedures to properly repair a break in the liner. Also, since a break or puncture of the tubeless tire will often occur in the sidewall or shoulder of the tire it is necessary to provide some type of adjustable repair means whereby this portion of the tire can also be repaired.

In accordance with the present invention a new tire repair apparatus has been designed and constructed particularly for repair of tubeless type tires. This apparatus provides means whereby the repairing of the tire in the sidewall or crown can easily be accomplished. Means are also provided to mount and spread the beads of the tire so that access can be easily had to the damaged portion of the carcass.

The preferred construction of the apparatus of the invention includes a cradle or base member. Means are provided on each edge of the cradle or base to grip and spread the beads of the tire. A closure member covers the cradle or base member. Vulcanizing means are mountable in the closure member to be received within the carcass of the tire between the spread beads. The vulcanizing means is adjustably mounted on the closure member so that it can be applied to any portion of the tire needing repairs.

Accordingly, it is an object of this invention to provide a new tire repair apparatus.

Another object of the invention is to provide a new tire repair apparatus specifically designed for making repairs on tubeless type tires.

A further object of this invention is to provide a compact, economical tubeless tire repair apparatus.

A still further object of this invention is to provide a tubeless tire repair apparatus wherein a break or puncture in any portion of the tire can be reached for repair.

Another object of this invention is to provide a tubeless tire repair apparatus incorporating means therein to receive and hold a tubeless tire with the beads spread allowing access for the repairing apparatus within the tire.

Another object of the invention is to provide a tire repair apparatus having vulcanizing means adjustably mounted therein so as to be engageable with any portion of the carcass needing repair.

Various other objects, advantages and features of the invention will become apparent from the following description taken in connection with the accompanying drawings, in which.

Figure 1:
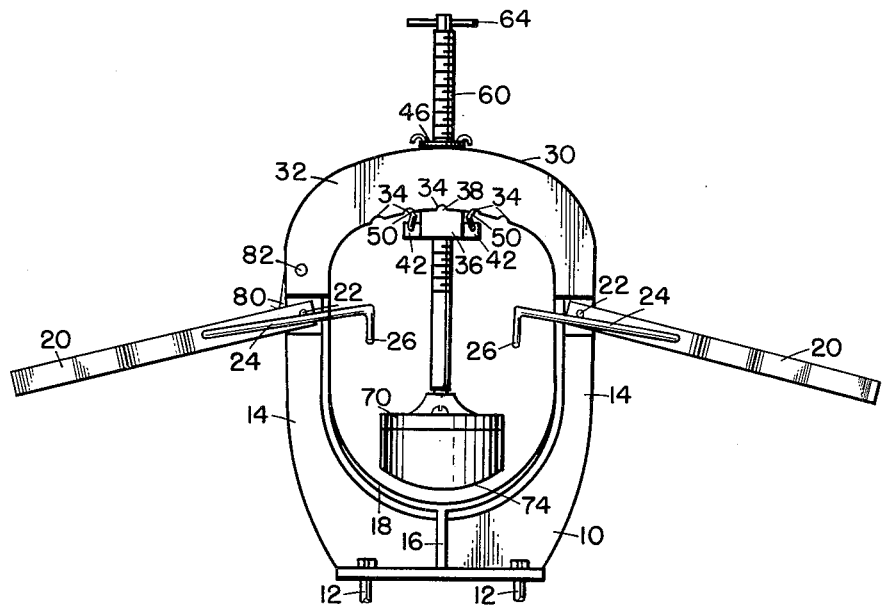
FIG. 1 is a side elevation view of the tire repair apparatus of the invention.

The following is a discussion and description of a preferred specific embodiment of the new tubeless tire repair apparatus of the invention, such being made with reference to the drawings whereon the same reference numerals are used to indicate the same or similar parts and/or structure. It is to be understood that such discussion and description is not to unduly limit the scope of the invention.

Referring now to the drawings in detail, the tubeless tire repair apparatus of the invention includes a generally U-shaped base or cradle member 10 which can be secured to a suitable support, not shown, by mounting bolts 12 or other suitable mounting means. Each end of the U-shaped base or cradle member 10 has a yoke which is formed by the spaced supports 14. The supports 14 when constructed in the manner shown also reinforce the cradle member 10 along with the reinforcing rib 16. The inside central portion 18 of the cradle or base member 10 preferably has a smooth generally arcuate bottom surface which extends longitudinally a short distance.

Figure 2:
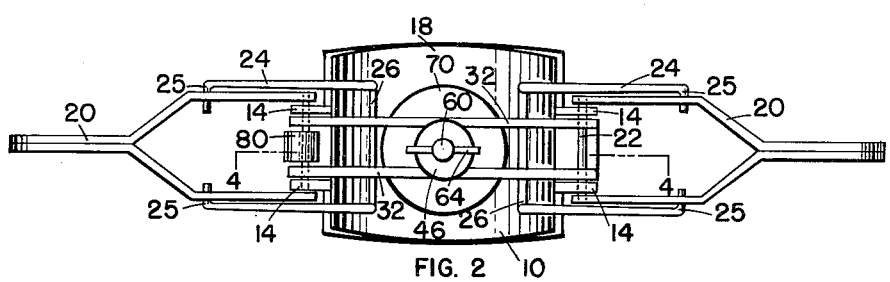
FIG. 2 is a top plan view of the tire repair apparatus of the invention.
Figure 3:
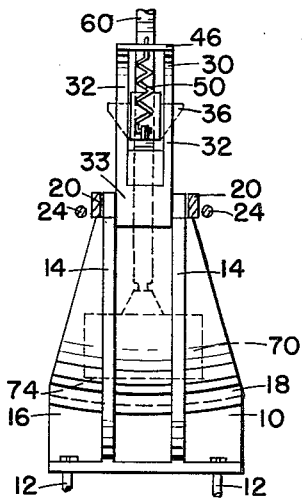
FIG. 3 is a side elevation view of the apparatus of the invention.

Each of the yolks 14 have handles 20 pivotally mounted thereon by a pivot pin 22. The handles 20 are preferably forked or bifurcated at the ends with each of the ends being received by the pivot pin 22. The handles 20 can be made in one piece, or they can be made of two separate identical members as best shown in FIG. 2 and secured together in any suitable manner, such as by welding, rivets, and the like.

Each of the handles 20 has a generally U-shaped spreader arm 24 pivotally mounted thereon intermediate the ends of the handles and preferably in the forked portion. The arms 24 are preferably cylindrical, and can be mounted on the handles 20 by bending the ends 25 and inserting them into mounting holes in the handles 20. The arms 24 can be made of a spring metal material to facilitate the mounting. The arms 24 can pivot on the handles 20 and are extendable into the cradle or U-shaped member 10. The center portion 26 of the U-shaped arm is preferably bent downwardly to provide a tire bead engaging flange. The two U-shaped spreader arms 24 act together to open the tire 28 to the position shown in FIG. 4. The spreader arms 24 are preferably dimensioned so that they pass on the outside of the handles 20 into the center portion of the cradle 10 as best seen in FIG. 2.

A top or closure member 30 is pivotally mounted on the yolk of the base or cradle member 10 in any suitable manner, such as by the pivot pins 22. The top or closure member 30 is preferably constructed of two spaced, generally arcuate side portions 32 secured together at the ends by connecting members 33. The bottom face or edge of each of the spaced side portions 32 has a series of spaced arcuate recesses 33. The recesses 33 in both of the spaced side members 32 are preferably spaced the same and are aligned relative to each other.

A mounting member 36 has an arcuate projecting portion 38 on the upper surface thereof on both sides of the mounting member 36 which is engageable in the recesses 34 of the side portions 32. The mounting member 36 has a central portion 40, FIG. 4 which is positioned between the spaced side portions 32 which act together with the projecting portion 38 to accurately position the mounting member 36. The mounting member 36 has diametrically opposed flanges 42 extending from the body portion and the flanges 42 have apertures 44 therethrough. A common washer or second mounting member 46 is positioned across the top of the side portions 32. The washer or mounting member 46 has diametrically opposed apertures 48, FIG. 4, and is mounted on the side portions with the apertures 48 between the spaced side members 32.

Helical springs 50 connect the mounting members 36 and 46 with the ends of the springs 50 being received in the apertures 44 and 48 to resiliently mount the mounting members relative to each other and the side portions 32. The washer or mounting member 46 has a centrally located aperture 52 therein, and the mounting member 36 has a centrally located threaded opening 54 approximately the same size as the aperture 52. When the mounting members 36 and 46 are aligned, the openings 52 and 54 are also aligned.

An arm member 60, which is preferably threaded over the major portion of its length, is received in the openings 52 and 54 of the mounting members. The arm 60 will pass through the opening 52 and will be threadedly received in the opening 54 to adjustably mount the arm 60 on the mounting member 36. The inner end of the arm 60 has a ball 62 on the end thereof and is received within the central portion of the cradle 10. A suitable handle 64 is mounted on the opposite or outside end of the arm 60, and by turning the handle 64 the rod 60 is rotated and will be moved relative to the mounting members 36 and 46 to place the ball end of the arm into or out of the cradle.

Figure 4:
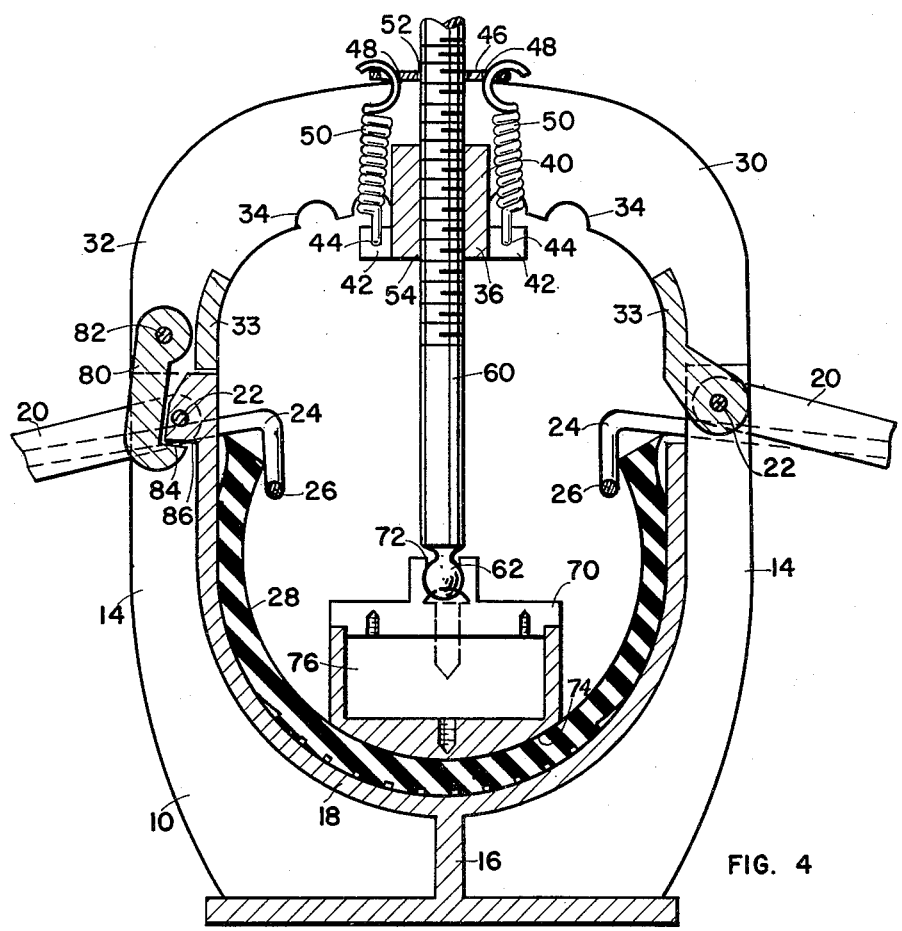
FIG. 4 is an enlarged cross section view taken along the line 4—4 of FIG. 2 showing a tire mounted therein.

A vulcanizing member 70 has the top thereof provided with a spherical socket 72, FIG. 4, which receives the ball 62 and retains the vulcanizing member 70 on the arm 60 by this universal type connection. Other means of mounting the vulcanizing member 70 on the arm 60 can be used, if desired. The bottom surface 74 of the vulcanizing member 70 is preferably arcuate in cross section so as to matingly engage the inside surface of the carcass of the tire 28 as best seen in FIG. 4. The vulcanizing member 70 is preferably made in parts or sections, and a suitable heater element is received within the chamber 76 formed by the parts. The heater element provides the necessary heat to be used in repairing the tire 28.

In order to secure the closure member 30 in position on the base or cradle member 10, a latch 80 is mounted by a pivot pin 82 on the end of the closure member 30 opposite from the pivotal mounting of the closure member on the yoke 14. The latch 80 has a notch 84 which engages an extending portion 86 between the spaced supports 14. While this type of latch means is preferred due to its convenience and simplicity, other suitable securing means can be used, if desired.

Figure 5:
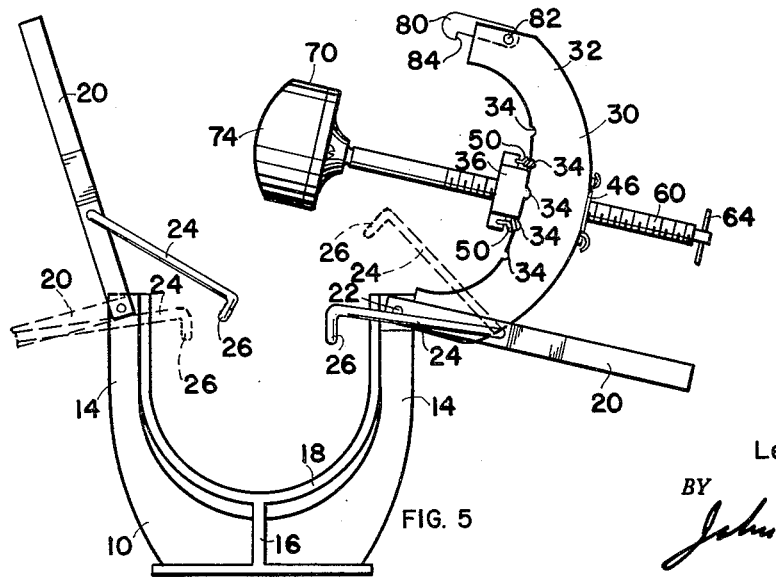
FIG. 5 is a side elevation view showing the apparatus open and the expanding mechanism in the different positions.

In operation, the latch 80 is disengaged from the projecting portion 86 and the closure member 30 is moved into the open position about pivot pin 22 to the position shown in FIG. 5. The handles 20 and the spreader arms 24 can be moved to various positions, as shown in the solid and dotted lines of FIG. 5 in order to provide access to the cavity within the cradle or base 10 so that a tubeless tire 28 or the like can be received therein for repair. When the tire 28 is within the cradle 10, the handles 20 and arms 24 are lowered to the down position with the central portion 26 of the arms 24 engaging the beads of the tire and holding them flat against the side of the cradle 10. With the tire in this position, the vulcanizing element 70 is placed in position within the tire carcass by lowering the closure member 30 into place and securing it there with the latch 80 and the cooperating portion 86. If the repair is to be made in the crown of the tire 28, the projecting portion 38 on the mounting member 36 is positioned in the center arcuate recess 34 of the spaced side members 32 of the closure member 30. Tire patching material is placed on or in the break in the tire and the handle 64 is then turned to place the vulcanizing member 70 into contact with the patching material. The heater element is then activated and the vulcanizing process occurs in the usual and common manner of tire repairing.

If the repair is to be made slightly off the center or crown portion of the tire, the universal type mounting of the vulcanizing member 70 on the arm 60 can be utilized to twist or turn the vulcanizing member slightly from the vertical position into the desired engagement with the carcass of the tire 28. On the other hand, if the repair is to be made in the shoulder or the sidewall of the tire 28 and cannot be reached by turning the vulcanizing element 70 on the universal mounting, then the handle 64 is turned to raise the vulcanizing member 70 out of engagement with the tire carcass 28 a suitable distance. When this has been done, the handle 64 can be pressed downwardly, and the arm 60 will pass freely through the washer or mounting member 46, but since it is threadedly engaged in the mounting member 36, the mounting member 36 will also be depressed so that the projection 38 is out of engagement with the center arcuate recess 34. With the mounting member 36 thus disengaged, the entire assembly consisting of the arm 60, the mounting members 36 and 46, and the vulcanizing member 70 can be freely moved around the closure member 30 with the mounting member 46 in sliding engagement with the upper surface thereof. During this adjustment the springs 50 hold the mounting assembly together. The mounting member 36 can thus be positioned in any of the recesses 34 on the closure member 30, and this variable positioning, together with the universal mounting of the vulcanizing element 70, will permit access to any region of the tire 28 needing repair.

It will be apparent from the foregoing description of the operation of the device that the mounting member 36 can be positioned so that the projection 38 thereon can engage and be received within the recesses 34 so as to position the vulcanizing element 70 on any portion of the tire 28 which needs repair. This variable mounting of the vulcanizing member 70 within the repair apparatus represents an important improvement over prior constructions due to its flexible application, and the ease and simplicity in operation.

As will be evident to those skilled in the art, various modifications of this invention can be made, or followed, in the light of this description and discussion, without departing from the spirit of the disclosure or the scope of the claims.

What is claimed is:

1. A tubeless tire repair apparatus comprising, in combination, a U-shaped cradle member, each end of said cradle having an integral yoke, said cradle member and said yoke being internally shaped to conform generally to the exterior shape of a tire each of said yokes having forked handles pivotally mounted thereon, and each of said handles having a U-shaped spreader arm pivotally mounted thereon, each of said spreader arms having the center portion thereof bent downwardly to provide a tire bead engaging flange, one of said yokes on said cradle having a closure member pivotally mounted thereon, said closure member consisting of generally arcuate spaced side portions secured together at the ends, a plurality of spaced arcuate recesses in the bottom face of each of said spaced side portions, said recesses being spaced alike on both of said side portions and aligned, a first mounting member extending between said side portions of said closure member and mountable on the lower side thereof, said mounting member having an arcuate projection thereon to be matingly engaged in said recesses to position said mounting member thereon, a second mounting member extending across the top of said side portions, each of said mounting members having apertures in opposite outer edges thereof between said spaced side members, two helical springs extending between said side members, the end of each of said springs being received in said apertures in said mounting members to removably and resiliently mount said mounting members on said side portions, each of said mounting members having a centrally located opening therein, said openings being aligned, said opening in said first mounting member being threaded, an arm member threadedly received in said opening of said first mounting member and slidably passing through said opening in said second mounting member, one end of said arm having a ball on the end thereof and being received in said cradle, a handle on the other end of said arm to move said ball end of said arm into or out of said cradle, a vulcanizing member, the top of said vulcanizing member having a spherical socket formed therein to receive said ball end of said arm to mount said vulcanizing member on said arm, the bottom surface of said vulcanizing member being arcuate in cross section, heater means in said vulcanizing member to apply heat to a tubeless tire within said cradle, and latch means pivotally mounted on said closure member at the end of said member opposite from said pivotal mounting of said closure member on said cradle, said latch means having a notch therein engageable with a portion of said yoke to secure said closure member and said yoke, said device being constructed and adapted to receive a tubeless tire in said cradle with said spreader arms in engagement with the beads of said tire so that said vulcanizing member can engage the carcass of said tire during repair of said tire.

2. A tubeless tire repair apparatus comprising, in combination, a U-shaped cradle member, each end of said cradle having an integral yoke, said cradle member and said yoke being internally shaped to generally conform to the exterior shape of a tire, each of said yokes having a handle pivotally mounted thereon, each of said handles having a spreader arm pivotally mounted thereon and positionable within said cradle to provide a tire engaging flange, a closure member mounted on one of said yokes, said closure member consisting of generally arcuate spaced side portions secured together at the ends, a plurality of spaced recesses in the bottom face of each of said side portions, said recesses being spaced alike on both of said side portions and aligned, a mounting member extending between said side portions of said closure member and mountable on the lower side thereof, said mounting member having projecting structure thereon to matingly engage said recesses in said spaced side portions, a threaded opening passing through said mounting member, a washer extending across the top of said side portions, said mounting member and said washer having opposed apertures formed therein in the edges thereof, and spring means extending between said side members and received in said apertures of said mounting member and said washer to removably and resiliently mount said mounting member and said washer on said closure member, an arm member threadedly received by said opening in said mounting member and passing through the central portion of said washer, said arm member having a ball on one end thereof, a handle on the other end of said arm, a vulcanizing member, a spherical socket in the top of said vulcanizing member to receive said ball end of said arm to mount said vulcanizing member thereon, the bottom surface of said vulcanizing member being arcuate in cross section, means supplying heat to said vulcanizing member, and latch means on said closure member engageable with said cradle member to secure said closure member thereon, said device being constructed and adapted to receive a tubeless tire in said cradle with said spreader arms in engagement with the beads of said tire so that said vulcanizing member can engage the carcass of said tire during repair of said tire therein.

3. A tubeless tire repair apparatus comprising, in combination, a base member, each end of said base having a yoke, said base member and said yokes being shaped on the inner surface to generally conform to the outer surface of a tire, each of said yokes having a handle pivotally mounted thereon, each of said handles having a spreader arm pivotally mounted thereon and extendable into said base, a closure member pivotally mounted on one of said yokes and removably attached to the other of said yokes, spaced recesses in the bottom of said closure member, a mounting member mounted on the lower edge of said closure member, said mounting member having a projection thereon positionable in said recesses on said closure member, and resilient means operatively connected to said mounting member and said closure member to removably position said projection on said mounting member in said recesses on said closure member, an elongated arm adjustably secured to said mounting member, one end of said arm having a ball on the end thereof, and the other end of said arm having a handle thereon, a vulcanizing member, said vulcanizing member having a spherical socket formed therein receiving said ball end of said arm to mount said vulcanizing member on said arm, and heater means in said vulcanizing member, said device being constructed and adapted to receive a tubeless tire in said base member with said spreader arms in engagement with the beads of said tire so that said vulcanizing member can engage the carcass of said tire during repair of said tire.

References Cited in the file of this patent
UNITED STATES PATENTS

| | | |
|---|---|---|
| 1,141,519 | Bancroft | June 1, 1915 |
| 1,718,485 | O'Sullivan | June 25, 1929 |
| 1,959,431 | King | May 22, 1934 |
| 2,421,100 | Lakso | May 27, 1947 |
| 2,939,677 | Duerksen | June 7, 1960 |